Patented July 29, 1930

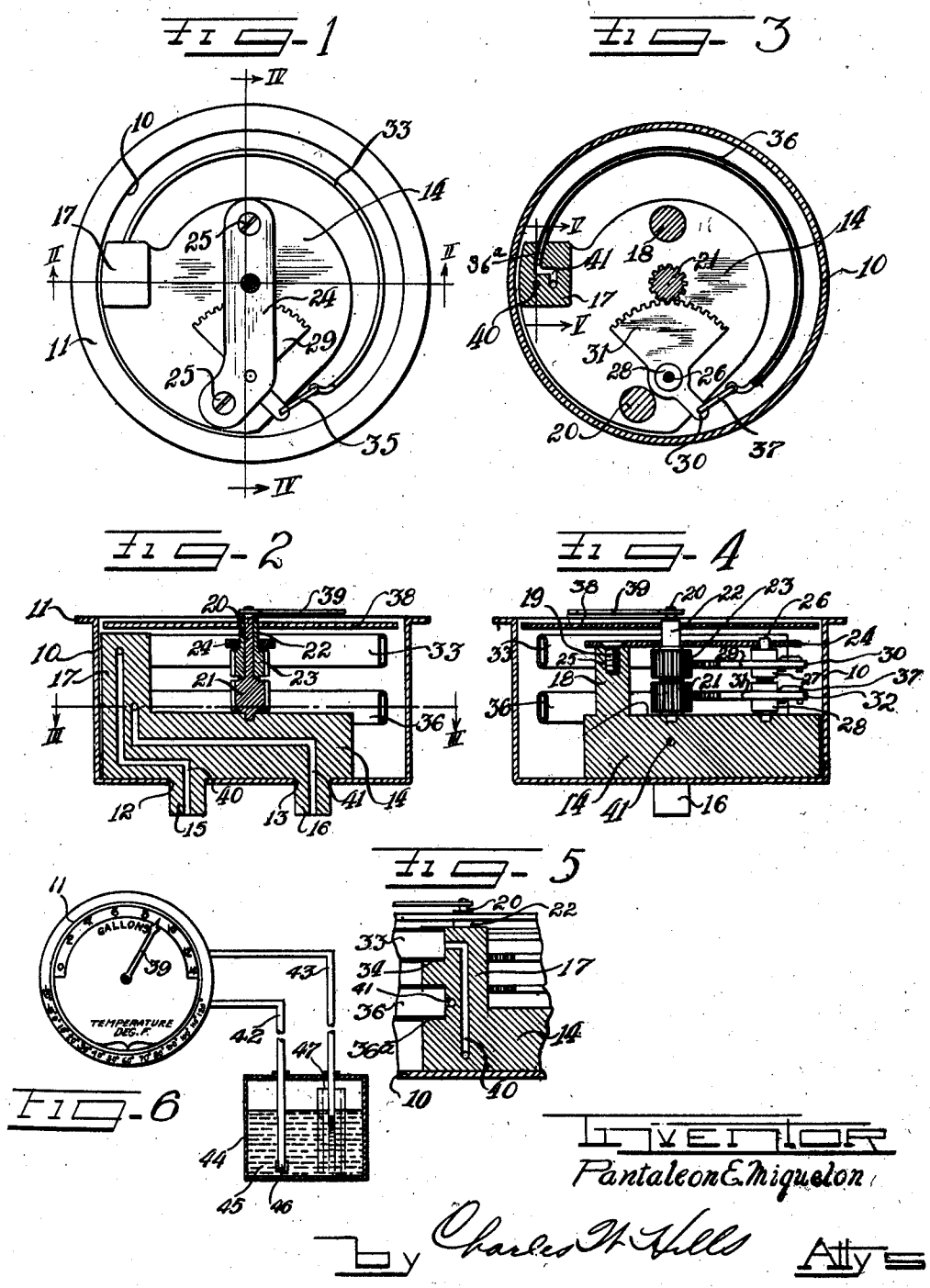

1,771,646

UNITED STATES PATENT OFFICE

PANTALEON E. MIQUELON, OF CHICAGO, ILLINOIS

PRESSURE-CONTROLLED LIQUID-LEVEL GAUGE

Application filed April 21, 1927. Serial No. 185,376.

This invention relates to improvements in gauges, and more particularly to a liquid level or quantity indicating gauge which has few parts and is inexpensive to manufacture, and which operates upon a new principle, adjusts itself automatically to correspond with temperature changes, and gives indications accurate to a degree not heretofore attainable in devices of this character.

In devices of this character now in use, the amount of error in the indications therefrom is directly proportional to the degree of variation of the temperature in either direction from a mean or starting temperature. If the temperature increases above a mean temperature the gauges commonly used, due to the expansion of the air and liquid therein, will indicate a larger quantity of liquid than is actually contained in the receptacle to which the gauge is connected, and if the temperature drops below the mean temperature the gauges indicate a smaller quantity than the receptacle actually contains. When such a gauge is connected to the fuel tank of a vehicle the faulty indications thereon, especially in hot summer weather, prove decidedly irksome and frequently result in great loss of time and unnecessary expense to the driver of the vehicle.

With these objections in view it is accordingly an object of this invention to provide a liquid level or quantity indicating gauge which automatically adjusts itself to correspond with temperature changes and gives accurate indications at any and all times.

Another object of this invention is to provide a combined and accurate liquid-level and temperature indicating gauge.

A further object of this invention is to provide an accurate gauge of the class described adapted for installation in a vehicle.

Other and further important objects of this invention will be apparent from the disclosures in the specification and the accompanying drawings.

The invention (in a preferred form) is illustrated in the drawings and hereinafter more fully described.

On the drawings:

Figure 1 is a top plan view of the interior of a device (when the same is in a horizontal position) embodying features of the present invention.

Figure 2 is a vertical sectional view of the device taken substantially on line II—II of Figure 1.

Figure 3 is a sectional view taken substantially on line III—III of Figure 2.

Figure 4 is a vertical sectional view with parts in elevation taken substantially on line IV—IV of Figure 1.

Figure 5 is a fragmentary vertical section taken substantially on line V—V of Figure 3.

Figure 6 is an elevational view, with parts in section, of the device in vertical position showing the same connected to a receptacle.

As shown on the drawings:

The illustrated embodiment of this invention, as shown in Figures 1 to 5 inclusive, is assumed to be and described as being in a horizontal position, for the purpose of clarity, although the device is equally adaptable for use in a vertical or any other position. As disclosed by Figures 1 to 6 inclusive, there is shown a casing 10 having an annular flange 11 thereon at the top thereof, and provided with apertures 12 and 13 in the bottom thereof. Mounted in the casing 10 is an irregularly shaped block 14 which is provided with two depending bosses 15 and 16 adapted to extend through the apertures 12 and 13 respectively. An upright portion 17 is provided on the top side of the block 14 near its outer margin, and adjacent the inner margin is a relatively long boss 18 having a threaded aperture 19 therein, and substantially opposite to this boss 18 and adjacent the outer margin of the block 14 a similar boss 20 is provided.

The block 14 provides a bearing surface for a shaft 20 which has an integral gear 21 thereon. Loosely enclosing the shaft 20 is a sleeve 22 which is also provided with an integral gear 23 similar to the gear 21. The shaft 20 and sleeve 22 are held in position by a supporting member 24 secured to the bosses 18 and 20 by screws 25. Also rotatably supported by the member 24 and block 14 is a shaft 26 around which are provided two independently rotatable sleeves 27 and 28, respectively. Secured to the sleeve 27 is a threaded sector 29 which is engageable with the gear 23 and which has a rearwardly extending portion 30 thereon, and secured to the sleeve 28 is a similar sector 31 provided with a rearwardly extending portion 32. An elastic or Bourdon tube 33 is provided within the casing 10 and extends substantially halfway therearound. One end of the tube 33 is imbedded in the upright portion 17 of the block 14 as shown at 34 and the other end is secured to the rearwardly extending portion 30 of the toothed sector 29 by the link 35. Adjacent the tube 33 a similar tube 36 is provided, one end of which is imbedded in the block 14 as shown at 36ª, and the other end of which is connected to the extended portion 32 of the sector 31 by a link 37.

Fixedly secured adjacent the top of the sleeve 22 is a disc scale or dial 38 which may be marked in any desired liquid quantity units, or as shown in Figure 6 to indicate gallons. The shaft 20 extends upwardly beyond the sleeve 22 and adjacent its top a pointer 39 is fixedly secured thereto, which pointer is adapted to rotate over and above the scale dial 38 (Figure 6) to indicate the exact number of gallons in a receptacle to which the device is connected. Obviously, when the pressure of the air contained in the tube 33 increases the tube will tend to straighten out thereby actuating the sector 29 in engagement with the gear 23 and will rotate the disc 38. Similarly the pointer 39 will be actuated by the variation of the pressure of the air in the tube 36 independent of the action of the tube 33.

Passing through the block 14 and the bosses 15 and 16 is a pair of passages 40 and 41, respectively. The passage 40 communicates with the tube 33 and the passage 41 with the tube 36. These passages 40 and 41 are adapted to be connected at their terminations in the bosses 15 and 16, respectively, to connecting pipes or lines 42 and 43 which in turn extend into the interior of a liquid receptacle 44. As shown at 46 the line 42 terminates in a sealed end within the receptacle 44. The end of the line 43 extending into the receptacle 44 is left open to permit the liquid 45 to rise within the line. Baffle means 47 are provided within the tank 44 around the terminus of the line 43 to prevent any undue surging of the liquid 45 from affecting the gauge. These baffle means preferably comprise a pair of concentric cylinders in spaced relationship, the outer being imperforate with an open bottom, and the inner having a closed bottom and suitable apertures spaced along the sides thereof, the tube 43 extending into the inner cylinder to a point spaced from the bottom thereof.

The temperature is indicated by a scale of degrees 48 upon the flange 11 (Figure 6) and a pointer 49 secured to the disc 38.

The pointer 39 actuated by the tube 36 will change its position when a change in temperature or a change in the level of the liquid in the tank 44 occurs. When a change in temperature occurs the disc 38 actuated by the tube 33 will move with the pointer 39 a distance corresponding to the change in temperature and accurate readings will always be obtainable. The temperature will also be indicated by the pointer 49 on the disc 38 associated with the scale 48 on the flange 11 of the casing 10.

From the foregoing, it will be apparent that I have provided a liquid-level or quantity indicating gauge affording marked improvements over the gauges now in use, and the accuracy of which is unaffected by temperature changes. The gauge is adaptable for installation in any desired place or position in a vehicle in connection with a fuel tank on said vehicle. Moreover, the gauge is formed of a minimum of parts which are easily assembled, is durable, and may be manufactured at a minimum cost.

I am aware that many changes may be made and numerous details of construction may be varied through a wide range without departing from the principles of this invention and I, therefore, do not purpose limiting the patent granted hereon, otherwise than necessitated by the prior art.

I claim as my invention:

In a device of the character described, a casing, a metallic block in said casing and having a pair of passages therethrough, a pair of elastic tubes in said casing each having an end joined to the terminus of a corresponding one of said passages, a pointer, means operatively connecting the free end of one of said tubes to said pointer, a movable scale dial for cooperating with said pointer, and means operatively connecting the free end of the other of said tubes to said scale dial.

In testimony whereof I have hereunto subscribed my name at Chicago, Cook County, Illinois.

PANTALEON E. MIQUELON.